United States Patent [19]

Ishida

[11] Patent Number: 4,515,231
[45] Date of Patent: May 7, 1985

[54] COMBINATORIAL WEIGHING APPARATUS WITH SERIAL WEIGHING OPERATIONS

[75] Inventor: Takehisa Ishida, Uji, Japan

[73] Assignee: Kabushiki Kaisha Ishida Koki Seisakusho, Kyoto, Japan

[21] Appl. No.: 459,944

[22] Filed: Jan. 21, 1983

[51] Int. Cl.³ .................... G01G 19/22; G01G 19/32; G01G 15/00

[52] U.S. Cl. ........................ 177/25; 177/50; 177/122

[58] Field of Search ............... 177/122, 123, 59, 50, 177/25, 165, DIG. 12

[56] References Cited

U.S. PATENT DOCUMENTS

| | | | |
|---|---|---|---|
| 2,980,251 | 4/1961 | Howard | 177/123 X |
| 3,175,632 | 3/1965 | Rouban | 177/123 X |
| 3,643,752 | 2/1972 | Blodgett | 177/122 |
| 4,341,274 | 7/1982 | Hirand et al. | 177/25 |
| 4,398,612 | 8/1983 | Mikami et al. | 177/25 |
| 4,418,771 | 12/1983 | Henry et al. | 177/59 X |

*Primary Examiner*—E. A. Goldberg
*Assistant Examiner*—Patrick W. Foster
*Attorney, Agent, or Firm*—Staas & Halsey

[57] ABSTRACT

A combinatorial weighing apparatus has a plurality of pool hoppers associated with automatic weighing units, respectively, for weighing batches of articles which have been supplied from a supply unit into the pool hoppers. After the batches of articles have weight, which is close to preset weights, the batches of articles are fed into weighing hoppers. Weight values obtained by the weighing hoppers are computed in various combinations by a computer to find the combination of weights which is equal or closest to a preset weight.

12 Claims, 2 Drawing Figures

COMBINATORIAL WEIGHING APPARATUS WITH SERIAL WEIGHING OPERATIONS

BACKGROUND OF THE INVENTION

The present invention relates to a weighing apparatus, of the combinatorial weighing type, known as a computer scale.

A "computer scale" combinatorial weighing apparatus and its operation will briefly be described below.

The combinatorial weighing apparatus has a central distribution table of a conical configuration, a plurality of supply troughs disposed below a peripheral edge of the distribution table and arranged radially around the distribution table and a plurality of pool hoppers positioned respectively below radially outward ends of the supply troughs. Each of the pool hoppers has on its lower side a gate which is selectively openable and closeable. The combinatorial weighing apparatus also includes a plurality of weighing hoppers corresponding to numbers of pool hoppers. Each weighing hopper is associated with and positioned beneath a corresponding pool hopper. Each of the weighing hoppers also has on its lower side an openable and closable gate and is associated with a weight detector for weighing articles charged into the weighing hopper. A collection chute or receiving means is disposed below the weighing hoppers for collecting the articles discharged from the weighing hoppers and delivering them to a packaging unit.

In operation, articles to be weighed are transported by a supply unit such as a bucket conveyor to a position over the distribution table, and are dropped onto the latter around its tip or highest point. The distribution table is vertically reciprocably vibrated in helical motions by an electromagnetic vibratory unit to distribute the supplied articles substantially uniformly over the table in a radially outward direction toward the peripheral edge of the table. The distributed articles then fall off the peripheral edge of the distribution table into the supply troughs, which are reciprocably vibrated obliquely upwardly and downwardly by electromagnetic vibratory units disposed respectively below each of the supply troughs for delivering the articles radially outwardly to a distal end of each supply trough, from which the articles drop into the respective pool hoppers below. The vibratory motions of the distribution table and the supply troughs cause similar numbers of articles to be supplied into the pool hoppers in a unit period of time. When a number of articles close to a predetermined number are stored in each of the pool hoppers, upon elapse of a preset interval of time, the vibrations of the distribution table and the supply troughs are stopped, and the gates of selected pool hoppers are opened to allow the articles therein to be charged respectively into corresponding weighing hoppers positioned below the pool hoppers, in which the articles are weighed. The emptied pool hoppers are then supplied with articles through the foregoing article supplying operation until all of the pool hoppers are loaded again. The weight values obtained by the weighing hoppers are computed by a computer in a combinatorial arithmetic operation to find a combination of weights which is equal or closest to a preset weight. The gates of the weighing hoppers that contain the articles which give such a combination of weights are opened to discharge the articles from the weighing hoppers into the collection chute. The discharge articles are gathered at a lower central portion of the collection chute, and then packed in a bag or the like. Articles are again charged into the emptied weighing hoppers from the corresponding pool hoppers, which become empty and will be supplied with articles again from corresponding supply troughs. Simultaneously, the foregoing weighing operation is repeated.

If the articles are supplied from the supply troughs directly to the weighing hoppers, disturbances in the flow rate of the articles in the supply troughs vary the intervals of time needed for the articles to be supplied to the weighing hoppers, and the time required for effecting the combinatorial weighing operation would increase, a time increase is a disadvantage because it decreases the number of weighing operations performed per minute. Therefore, pool hoppers are used in order to ensure that a desired number of weighing cycles are performed per minute.

The computer scale combinatorial weighing as described above is capable of delivering to a packaging step, a wide variety of articles in batches having a total weight equal or closest to a preset weight. Where the preset weight is quite small, such as 20 g for example, and thin, lightweight articles such as potato chips are supplied to the weight hoppers, say 10 in number, there is a tendency for the apparatus to perform the combinatorial weighing inaccurately or in extreme cases to fail to effect the combinatorial weighing. More specifically, articles being fed from the distribution table to the collection chute are supplied from the supply troughs to the respective pool hoppers by oblique vibratory movements of the supply troughs. The vibrations cause the articles to be advanced progressively in the supply troughs and then to fall into the pool hoppers. In order to select from all of the weighing hoppers uniformly throughout repeated weighing operations, it is required that the number of articles supplied to the weighing hoppers have a weight close to a preset weight value. To this end, the supply troughs are controlled in their vibratory motion on a time-dependent basis in order to supply an appropriate number of articles to each pool hopper.

When the weight of combined batches of articles is small and hence the articles fed to each pool hopper are lightweight, the vibratory supply by the supply troughs under the supply interval control is liable to allow the articles to drop en masse into the pool hoppers. This causes certain pool hoppers to be supplied with articles which give an excessive total weight. Where thin articles, such for example, potato chips, are to be weighed, those potato chips which are stuck together tend to be supplied without being separated and some pool hoppers may be overweighted. As a result, the combinatorial weighing operation based on weight values given by the weighing hoppers may suffer from a reduced combinatorial probability that the combined weights will be equal or closest to a preset weight, and sometimes the combinatorial weighing can not be performed.

SUMMARY OF THE INVENTION

It is an object of the present invention to provide a combinatorial weighing apparatus having pool hoppers associated respectively with automatic weighing units to perform a weighing function so that articles in a wide variety of kinds can smoothly and accurately be weighed in combinatorial weighing operation.

Another object of the present invention is to provide a combinatorial weighing apparatus in which articles to be fed to pool hoppers are weighed in advance by weighing units and are supplied in appropriate weights to weighing hoppers for accurately detecting the combined weight of articles which is quite small or of sticky articles.

Still another object of the present invention is to provide a combinatorial weighing apparatus having weighing pool hoppers which allow a supply unit coupled with the pool hoppers to be simplified in construction.

According to the present invention, there is provided a combinatorial weighing apparatus having pool hoppers associated respectively with automatic weighing units for performing a weighing funcction. Articles supplied from a supply unit to the pool hoppers are weighed by the pool hoppers, and after the pool hoppers contain articles having a weight close to a predetermined weight, the articles are fed to weighing hoppers. To perform the weighing of articles supplied to the pool hoppers the pool hoppers are mounted on automatic weighing units. Combinations of the weight values determined by weight detectors respectively associated with the weighing hoppers are computed by a computer, and the weight combination which is equal or closest to a preset weight. Since articles in the pool hoppers are weighed for an appropriate-weight setting, the weight of articles which give a small combined weight or which are likely to stick together can be detected accurately, and errors caused by excessive article supply can be prevented.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
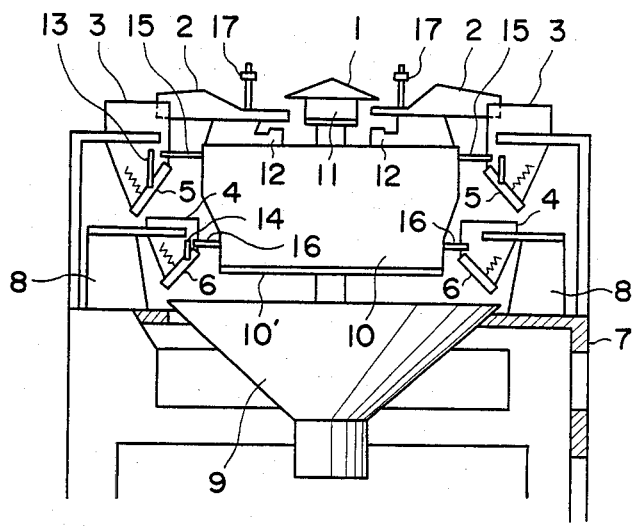
FIG. 1 is a schematic front elevational view of a conventional combinatorial weighing apparatus.

As shown in FIG. 1, a conventional combinatorial weighing apparatus includes a distribution table 1 of a conical configuration mounted on an electromagnetic vibratory unit 11 which actuates the distribution table by reciprocating in a helical motion for distributing and supplying articles received from a supply unit (not shown) uniformly in separate batches. A plurality of supply troughs 2 are disposed radially outwardly of the distribution table 1 at equal angular intervals therearound for receiving articles from the distribution table 1 and discharging them through their outlets on vibratory movement of the supply troughs 2. A plurality of pool hoppers 3 are located below the the outlets of the supply troughs 2, respectively, and have lower discharge outlets which are selectively openable and closable by gates 5. The pool hoppers 3 serve to receive and store articles fed from the corresponding supply troughs 2, and discharge the stored articles through the discharge outlets as they are opened by the gates 5. A weighing hopper 4 underlies the gate 5 of each of the pool hoppers 3 and has a lower discharge outlet which is selectively openable and closable by a gate 6. The weighing hoppers 4 are mounted respectively on weight detectors 8 disposed on a base 7 of a frame around its peripheral portion. The weight detectors 8 operate to weigh combinations of batches of articles received from the pool hoppers 3 in the weighing hoppers 4. The batches of articles which have been selected and discharged in combination by the weighing hoppers 4 under the control of the weight detectors 8 are fed into a collection chute 9 supported on the base 7 below the weighing hoppers 4. A drive unit 10 is attached to a circular support table 10' and positioned vertically between the collection chute 9 and the supply troughs 2. The drive unit 10 serves to open and close the gates 5, 6 of the pool hoppers 3 and the weighing hoppers 4, as described below. Levers 13, 14 are fixed respectively to the gates 5, 6 and can be angularly moved to open the gates 5, 6 in response to being pushed by pusher rods 15, 16, respectively, which project radially outwardly from the periphery of the drive unit 10. Electromagnetic vibratory units 12 are mounted on the top of the drive unit 10 and support the supply troughs 2, respectively, for vibrating the latter. A stack level sensor 17 controls the article supply operation of the supply unit (not shown) to keep articles stacked in a constant number on the distribution table 1.

The construction as described above is of a conventional arrangement. According to the present invention, the pool hoppers 3 are associated with automatic weighing units 18 (FIG. 2) for performing a weighing function.

Figure 2:
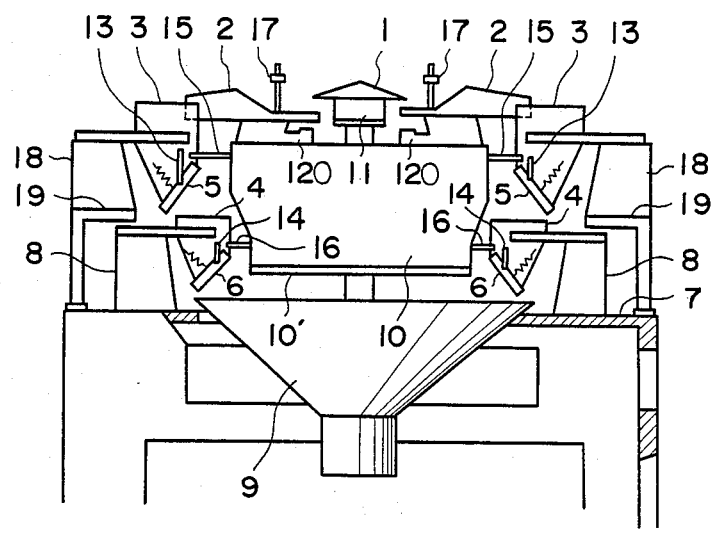
FIG. 2 is a schematic front elevational view of a combinatorial weighing apparatus according to the present invention.

As illustrated in FIG. 2, the base 7 has an increased diameter to provide thereon a plurality of support brackets 19 disposed radially outwardly of the weight detectors 8 coupled with the weighing hoppers 4 and arranged circumferentially at equal intervals. The automatic weighing units 18 are mounted respectively on the support brackets 19 with the pool hoppers 3 supported on the automatic weighing units 18, respectively. Articles supplied to the pool hoppers 3 are weighed at all times by the automatic weighing units 18. When articles having a suitable total weight are received by a pool hopper 3, the vibrator 120 for the supply trough 2 corresponding to that pool hopper 3 is de-energized to stop its vibrations, causing the interruption of the supply of articles into the pool hopper 3. When it becomes necessary to supply the received articles, the gate 5 is opened to feed them into the corresponding weighing hopper 4. The optimum weight of articles to be received by each of the pool hoppers 3 is selected to equal the weight of articles in each weighing hopper 4 used appropriately for combinatorial weighing with a slight weight margin ranging from +1 to 2 g. The automatic weighing units 18 are adjusted to have a weight setting as described above before any articles are supplied from the supply troughs 2 to the pool hoppers 3. The automatic weighing units 18 may be of the same construction as that of the automatic weighing units 8 for the weighing hoppers 4. Since the automatic weighing units 18 only weigh the articles in the pool hoppers 3, the automatic weighing units 18 may be of a simple design such as a weight detector comprising a strain gage having a predetermined weight setting, or a detector comprising a load cell. The automatic weighing units 18 thus enable the pool hoppers 3 to supply the respective weighing hoppers 4 with batches of received articles in weights appropriate for desired combinatorial weighing in the weighing hoppers 4, so that the weights as measured by the weighing hoppers 4 can fall within an allowable weight range.

The weight set for articles received in the pool hoppers 3 may be selected individually for each pool hopper 3, or a single such weight setting may be established for all of the pool hoppers 3 since such a weight setting contains an allowance.

Although in the foregoing embodiment articles are supplied to the pool hoppers from the supply troughs on vibratory movement of the supply trough, the articles may be supplied from the pool hoppers to the corresponding weighing hoppers using simple supply devices such as ordinary conveyors, but not by way of vibratory conveyance, as the batches of articles have been weighed.

With the combinatorial weighing apparatus according to the present invention, as described above, the pool hoppers function to weigh articles that have been supplied from the supply troughs into the pool hoppers, so that the total weight of the articles contained in each pool hopper will substantially correspond to a preset weight. Thereafter, the articles are fed to the weighing hoppers. Since articles are weighed by the pool hoppers prior to being supplied to the weighing hoppers to be combinatorially weighed and the weight settings in the pool hoppers are selectable to be in a range appropriate for the subsequent combinatorial weighing operation, the batches of articles can be discharged from corresponding weighing hoppers to provide a combined total weight which is equal or closest to a preset weight value without error. With articles weighed to an appropriate weight value in the pool hoppers, the weight of articles having a small combined weight or which stick together can be detected accurately thereby preventing troubles such as an excessive supply of articles to the weighing hopper tend to be caused by a conventional mode of control of the time in which the supply troughs are vibrated.

The weighing pool hoppers according to the present invention can simplify the supply units for supplying articles to the pool hoppers, and can be widely used in applications for handling a wide variety of kinds of articles, particularly lightweight articles which have been difficult to be weighed in batch combinations.

The present invention is equally applicable, with the foregoing advantages attained, to combinatorial weighing apparatus in which the weights of batches of articles are each divided by the weight of a single article to compute the number of articles in each batch, and a combinatorial computation is effected on the basis of the numbers of articles in the batches to obtain a combination of numbers which is equal or closest to a preset number, so that batches of articles corresponding to the determined combination can be discharged. In such an application, each pool hopper is supplied with a number of articles which is predetermined with respect to the number of articles in each weighing hopper which is appropriate for combinatorial weighing.

Although a certain preferred embodiment has been shown and described in detail, it should be understood that many changes and modifications may be made therein without departing from the scope of the appended claims.

What is claimed is:

1. A combinatorial weighing apparatus for weighing articles comprising:
   a supply device for supplying articles;
   a plurality of pool hoppers positioned adjacent to said supply device for receiving articles from said supply device;
   a plurality of weighing units respectively associated with said pool hoppers for weighing the articles contained in each pool hopper to provide in each pool hopper a batch of articles having a predetermined weight; and
   a plurality of weighing hoppers, positioned below and respectively associated with said pool hoppers, for receiving the batches of articles from said pool hoppers, respectively, and combinatorially weighing the batches of articles.

2. A combinatorial weighing apparatus comprising:
   a distribution table having a peripheral edge for supplying articles from said peripheral edge;
   a plurality of supply troughs disposed below and around said peripheral edge of said distribution table for receiving the articles from said distribution table, each of said supply troughs having a distal end;
   a plurality of vibratory units respectively associated with said supply troughs for imparting vibratory motions to move the articles over said supply troughs;
   a plurality of pool hoppers respectively disposed below said distal ends of said supply troughs for receiving the articles from said supply troughs each pool hopper having a weighing unit, said weighing unit being operatively connected to the vibratory unit respectively associated with the pool hopper, for weighing the articles contained in said pool hoppers and stopping the respective vibratory units when the weight of the articles in each respective pool hoppers reaches a preset weight; and
   a plurality of weighing hoppers positioned below and respectively associated with said pool hoppers for receiving the articles from said pool hoppers and combinatorially weighing the articles in said weighing hoppers.

3. A combinatorial weighing apparatus according to claim 1 or 2, wherein the preset weight of articles received in each pool hopper is selected to be substantially equal, with a predetermined margin, to the weight of articles received in each weighing hopper which is suitable for the combinatorial weighing operation by said weighing hoppers.

4. A combinatorial weighing apparatus according to claim 1, wherein each weighing unit includes a strain gage.

5. A combinatorial weighing apparatus according to claim 1, wherein each weighing unit includes a load cell.

6. A combinatorial weighing apparatus according to claim 2, further comprising a vibratory unit for vibrating said distribution table.

7. A combinatorial weighing apparatus according to claim 2, wherein each weighing unit includes a strain gauge.

8. A combinatorial weighing apparatus according to claim 2, wherein each weighing unit includes a load cell.

9. A combinatorial weighing apparatus for weighing articles, comprising:
   supply means for supplying the articles;
   a plurality of vibratory supply troughs for receiving articles from said supply means and moving the articles over said vibratory supply troughs by vibratory motion;

a plurality of first weighing means, operatively connected to, positioned adjacent to, and respectively associated with said vibratory supply troughs, for receiving batches of articles from said vibratory supply troughs, weighing the batches of articles and stopping the vibratory action of the respective vibratory supply trough when the weight of the batch of articles contained in each weighing means is substantially equal to a preset weight;

a plurality of second weighing means, positioned below and respectively associated with said first weighing means, for receiving the batches of articles from said first weighing means and combinatorially weighing the batches of articles contained in the second weighing means, selecting a combination of batches of articles having a combined weight closest to a target weight and supplying the selected combination of batches of articles; and receiving means, disposed below said plurality of second weighing means, for receiving the selected combination of batches from said second weighing means.

10. A combinatorial weighing apparatus according to claim 9, wherein each said first weighing means includes a load cell.

11. A combinatorial weighing apparatus according to claim 9, wherein each said first weighing means includes a strain gauge.

12. A combinatorial weighing apparatus according to claim 9, wherein said supply means includes a vibratory distribution table.

* * * * *

UNITED STATES PATENT AND TRADEMARK OFFICE
CERTIFICATE OF CORRECTION

PATENT NO. : 4,515,231
DATED : May 7, 1985
INVENTOR(S) : Takehisa Ishida

It is certified that error appears in the above-identified patent and that said Letters Patent is hereby corrected as shown below:

Front page, after "[22] Filed: Jan. 21, 1983", insert
--[30] Foreign Application Priority Data Jan. 22,
1982 [JP] Japan....57-8025--.

Signed and Sealed this

Twenty-second Day of October 1985

[SEAL]

Attest:

DONALD J. QUIGG

Attesting Officer

Commissioner of Patents and
Trademarks—Designate